United States Patent [19]
Komatsu

[11] Patent Number: 5,337,558
[45] Date of Patent: Aug. 16, 1994

[54] ENGINE EXHAUST PURIFICATION SYSTEM

[75] Inventor: Kazunari Komatsu, Hiroshima, Japan

[73] Assignee: Mazda Motor Corporation, Hiroshima, Japan

[21] Appl. No.: 32,058

[22] Filed: Mar. 16, 1993

[30] Foreign Application Priority Data

Mar. 16, 1992 [JP] Japan .................. 4-058251

[51] Int. Cl.$^5$ ............................................. F01N 3/28
[52] U.S. Cl. ........................................ 60/276; 60/277; 123/688; 123/691
[58] Field of Search ............... 60/276, 277; 123/691, 123/688

[56] References Cited

U.S. PATENT DOCUMENTS 5,099,647 3/1992 Hamburg ..................... 60/276

FOREIGN PATENT DOCUMENTS 63-97852 4/1988 Japan .

Primary Examiner—Douglas Hart
Attorney, Agent, or Firm—Keck, Mahin & Cate

[57] ABSTRACT

An engine exhaust purification system is provided with a catalyst in an exhaust line, and oxygen sensors disposed in the exhaust line upstream and downstream from the catalyst, respectively. Deterioration of the catalyst is judged based on a frequency ratio of reversal of an output from the downstream oxygen sensor with respect to a threshold value to an output from the upstream oxygen sensor with respect to a threshold value. The threshold value of the deteriorated oxygen sensor is changed so as to vary the frequency ratio of reversal.

7 Claims, 13 Drawing Sheets

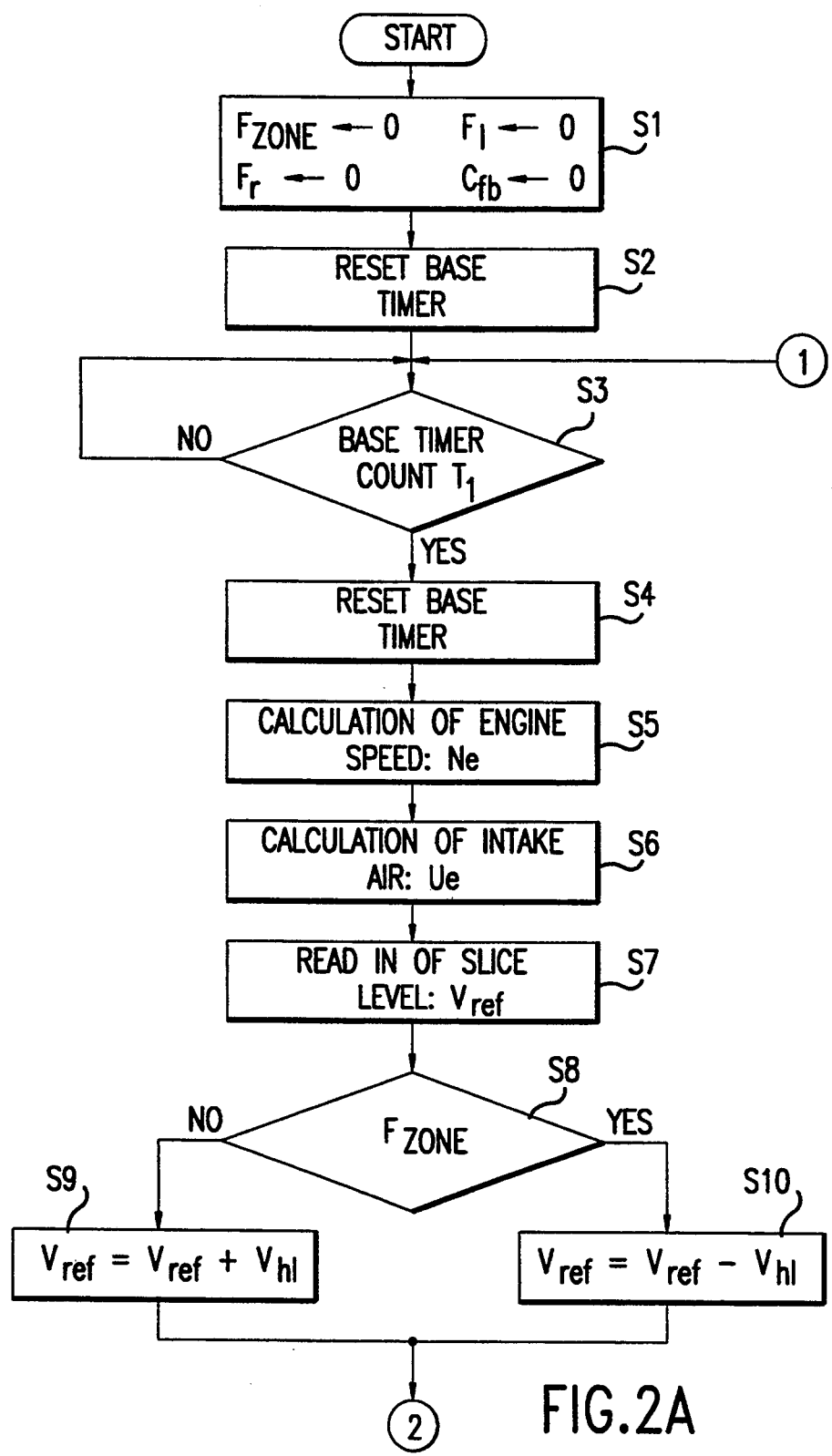

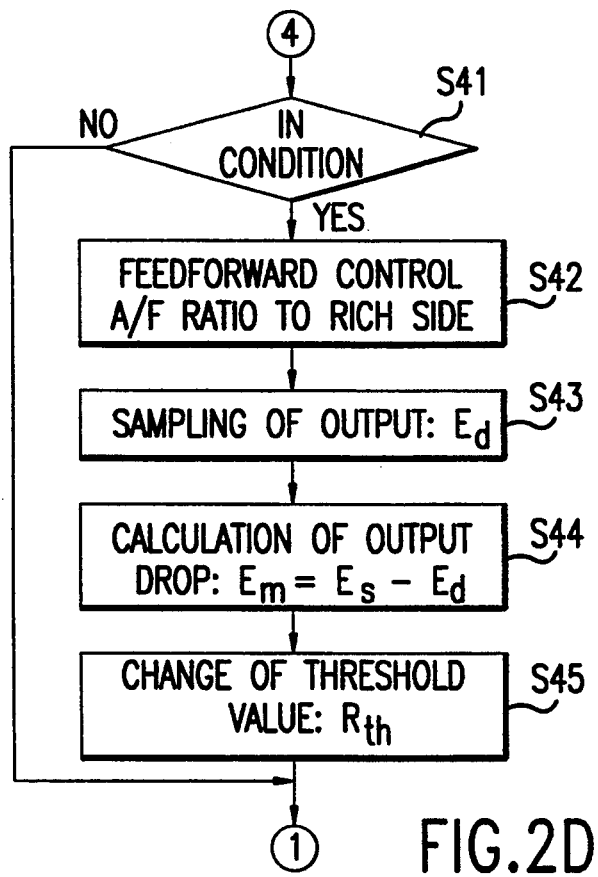
FIG.2D
FIG. 3A
FIG. 3B
FIG.3
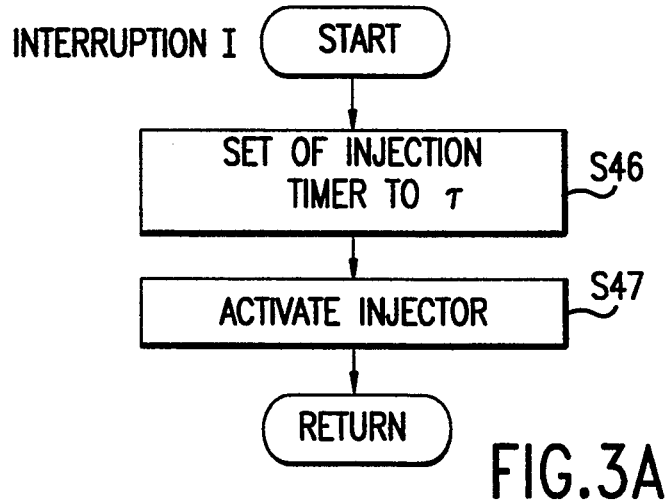
FIG.3A

ENGINE EXHAUST PURIFICATION SYSTEM

BACKGROUND OF THE INVENTION

1. Field of the Invention

This invention relates to an exhaust purification system for an internal combustion engine, and, more particularly, to an engine exhaust purification system in which deterioration of a catalyst can be detected with a high accuracy and reliability.

2. Description of Related Art

Typically, engine exhaust purification systems have catalytic converters, such as a catalytic converter using rhodium, located in exhaust lines. By means of chemisorption action of such catalyst, unburned contaminants are removed from exhaust gases. In this type of engine exhaust purification system, the functional deterioration of catalyst is manifest as a direct reduction of its exhaust purifying efficiency. This makes it necessary to adequately monitor the functional deterioration of catalyst. From a graphically demonstrated relationship, between oxygen occluding performance or efficiency and hydrocarbon (HC) purification ratio of an end catalytic converter using rhodium shown in FIG. 15, it is apparently proved that a decreases in oxygen occludinq efficiency of the catalytic converter using rhodium is accompanied by a decrease in hydrocarbon (HC) purification ratio. In a technique of detecting the functional deterioration of this type of catalytic converter which has been developed from this peculiar characteristic or relationship, oxygen ($O_2$) sensors are installed in the exhaust line upstream and downstream from the catalytic converter, respectively, and, based on the ratio of a reversal frequency of an output from the downstream oxygen ($O_2$) sensor to a reversal frequency of an output from the upstream oxygen ($O_2$) sensor, feedback control of air-fuel ratio is exercised. An example of such an engine exhaust purification system is found in, for instance, Japanese Unexamined Patent Publication No. 63-97852.

The detection of functional deterioration of a catalyst, based on the reversal frequency ratio of an output from the downstream oxygen ($O_2$) sensor to an output from the downstream oxygen ($O_2$) sensor, is grounded on the fact that when the catalyst keeps a normal oxygen occlusion efficiency, i.e. when it is within an allowable extent of functional deterioration, the concentration of oxygen in engine exhaust gases is less downstream from the catalytic converter than upstream from the catalytic converter, and, accordingly, the number of reversals or reversal frequency (Nb) of an output from the downstream oxygen sensor is lower than the number of reversals or reversal frequency (Na) of an output from the upstream oxygen sensor. From this fact, as shown in FIG. 16, it is said that the progress of functional deterioration of a catalyst, i.e. the deterioration of hydrocarbon (HC) purification ratio of a catalyst is accompanied by an increase in reversal frequency ratio (Nb/Na) of outputs from the downstream and upstream oxygen ($O_2$) sensors.

Otherwise, the detection of functional deterioration of a catalyst can be made based on the amplitude of an output of the downstream oxygen ($O_2$) sensor during a feedback control of air-fuel ratio exercised based on the output of the upstream ($O_2$) oxygen sensor, or based on an average output of the downstream oxygen sensor, or based on the number of reversals or reversal frequency with respect to a normal threshold value of an output from the downstream oxygen sensor.

In order to assure the practical accuracy and reliability of functional deterioration detection of catalyst made on the basis of an output of an oxygen sensor or outputs of upstream and downstream oxygen sensors, the oxygen sensor must hold its sensitivity to oxygen at a desirable level. If the oxygen sensor is functionally deteriorated, the functional deterioration detection of catalyst with a high accuracy and reliability is quite difficult. The oxygen sensor exhibits two types of functional deterioration, i.e. a reduction or drop in output voltage and a delay in responsiveness. As shown in FIG. 12, portraying a drop in output voltage accompanying deterioration of the oxygen sensor, when the oxygen sensor has no functional deterioration, it provides an output of high voltage for an enriched fuel mixture, as shown by a solid line. However, following functional deterioration of the oxygen sensor, its output voltage is greatly reduced, as shown by a broken line. In considering the relationship between an output voltage of the oxygen sensor and the air-fuel ratio of a fuel mixture, as shown in FIG. 13, the oxygen sensor, providing an output at a normal threshold voltage of approximately 0.45 V for an ideal air-fuel ratio of 1 when it is functioning normally decreases or drops its output voltage to approximately 0.3 V, lower than the normal threshold voltage, even for the ideal air-fuel ratio of 1 when it exhibits functional deterioration. This output voltage drop leads to a misjudgement that the fuel mixture is lean in spite of the fact that it is still rich. As a result, a drop in output voltage of the downstream oxygen sensor due to functional deterioration causes the output voltage to reverse frequently with respect to the normal threshold voltage for the ideal air-fuel ratio of 1, i.e. to increase the number of reversals or reversal frequency. When in fact the downstream oxygen sensor changes its output characteristics in such a way, the reversal frequency ratio (Nb/Na) of an output of the downstream oxygen sensor to an output of the upstream oxygen sensor varies to a greater degree. Accordingly, notwithstanding the fact that there is no functional deterioration of a catalyst, an erroneous judgement that the catalyst has deteriorated may be falsely induced.

Conversely, if there is a drop in output voltage of the upstream oxygen sensor, which serves to perform an air-fuel ratio control, due to functional deterioration, the upstream oxygen sensor provides an output indicating an air-fuel ratio leaner than an actual air-fuel ratio (see FIG. 13), and, consequently, a feedback control is exercised so as to enrich the fuel mixture. Then, the downstream oxygen sensor provides an output indicating an air-fuel ratio of enriched fuel mixture. Consequently, as seen in FIG. 7, when the upstream oxygen sensor is functionally normal, i.e. has not functionally deteriorated, its output voltage, which must be at a low level so as to indicate an air-fuel ratio of lean fuel mixture, as shown by a broken line, shifts to a higher level that indicates an air-fuel ratio of rich fuel mixture, as shown by a solid line, due to an actual enrichment of fuel mixture resulting from a drop in output voltage of the upstream oxygen sensor. This results in reducing the number of reversal or reversal frequency of output voltage with respect to the normal threshold voltage, and decreasing the frequency ratio (Nb/Na) of reversals of an output of the downstream oxygen sensor to reversals of an output of the upstream oxygen sensor, so as to easily induce such an erroneous judgment that there is no deterioration of a catalyst, in spite of an actual and considerable deterioration.

On the one hand, the delay of response accompanies functional deterioration of the oxygen sensor, as shown in FIG. 14, as progressive deterioration occurs in the oxygen sensor and there is an accompanying gradual delay in response. For example, when a fuel mixture changes from rich to lean, the oxygen sensor gradually lowers its output from the normal voltage as shown by a solid line to a deteriorated voltage as shown by a broken line. If in fact such a delay in response occurs, when, for instance, the oxygen sensor provides an output changing from high level to low level accompanying a change in air-fuel ratio from rich to lean, a change occurs in air-fuel ratio before the oxygen sensor has completely changed its output from high level to low level, so that the oxygen sensor must reverse its output during the change in level of the output. This leads to reducing the amplitude of output of the oxygen sensor. As a result, although the normal output has an amplitude sufficiently large to cause a specified number of reverses with respect to the normal threshold voltage of reverse (RTV), for example, when the downstream oxygen sensor shows a delay in response due to its own deterioration, as shown by a broken line in FIG. 9, however, the output inclines towards the rich side as the result of a reduction in amplitude when the downstream oxygen sensor has deteriorated, as shown by a solid line. This leads to reducing the number of reversals of the output with respect to the normal threshold voltage of reverse (RTV) by the inclination to the rich side. As a result, the reversal frequency ratio (Nb/Na) is lowered, and, consequently, there is easily induced the erroneous judgment that no deterioration has occurred in the catalyst, in spite of an actual and considerable deterioration.

In the detection of deterioration of a catalyst on the basis of outputs from the oxygen sensors disposed in an exhaust line upstream and downstream from the catalytic converter, a great influence is given by deterioration of the oxygen sensor directly concerned with the detection of deterioration. However, there has not been provided a technological innovation from the standpoint of the oxygen sensor deterioration, and, consequently, it is obvious that an improvement must be made from the standpoint of accuracy and/or reliability in the detection of deterioration of the catalyst.

SUMMARY OF THE INVENTION

It is therefore an object of the present invention to provide an exhaust gas purification system in which oxygen sensors are used to detect a deterioration of a catalyst.

It is another object of the present invention is to provide an exhaust gas purification system in which the deterioration detection of a catalyst is made based on a reversal frequency ratio of an output from one of the oxygen sensors located upstream and downstream from the catalyst which is correctly changed according to deterioration of the oxygen sensors so as to realize highly accurate and reliable detection of catalyst deterioration.

These objects of the present invention are accomplished by providing an engine exhaust purification system, for an internal combustion engine, having an engine exhaust purifying catalyst in an exhaust line, an upstream oxygen sensor disposed in the exhaust line upstream from the engine exhaust purifying catalyst, and a downstream oxygen sensor disposed in the exhaust line downstream from the engine exhaust purifying catalyst. Deterioration of the catalyst is detected based on an output ratio of an output from the downstream oxygen sensor to an output from the upstream oxygen sensor. Practically used as the output ratio is a frequency ratio of reversal of an output from the downstream oxygen sensor with respect to a threshold value to an output from the upstream oxygen sensor with respect to a threshold value. If at least one of the upstream and downstream oxygen sensors has been deteriorated, the threshold value of the deteriorated oxygen sensor is varied so as to correctly change the frequency ratio of reversal, thereby avoiding an erroneous deterioration detection of a catalyst due to deterioration of the oxygen sensor.

When deterioration of at least one of the oxygen sensors, arranged upstream and downstream from the catalytic converter, is detected, a correction is made for the output ratio, such as a reversal frequency ratio, used as a fundamental value of deterioration determination. This corrective change of the output ratio cancels out any adverse influence of the deterioration of the oxygen sensor in the determination of deterioration of the catalyst. Even if deterioration in the functional performance of the oxygen sensors has occurred, a determination can be made as to whether or not there has been any deterioration of the functional performance of the catalyst with a high accuracy and reliability, and erroneous deterioration detections of the catalyst are eliminated. This results in the maintenance of exhaust purification performance over an extended period of time.

BRIEF DESCRIPTION OF THE DRAWINGS

The above and other objects and features of the present invention will be clearly understood from the following detailed description with respect to preferred embodiments thereof when considered in conjunction with the accompanying drawings, in which.

DETAILED DESCRIPTION OF THE PREFERRED EMBODIMENT

Figure 1:
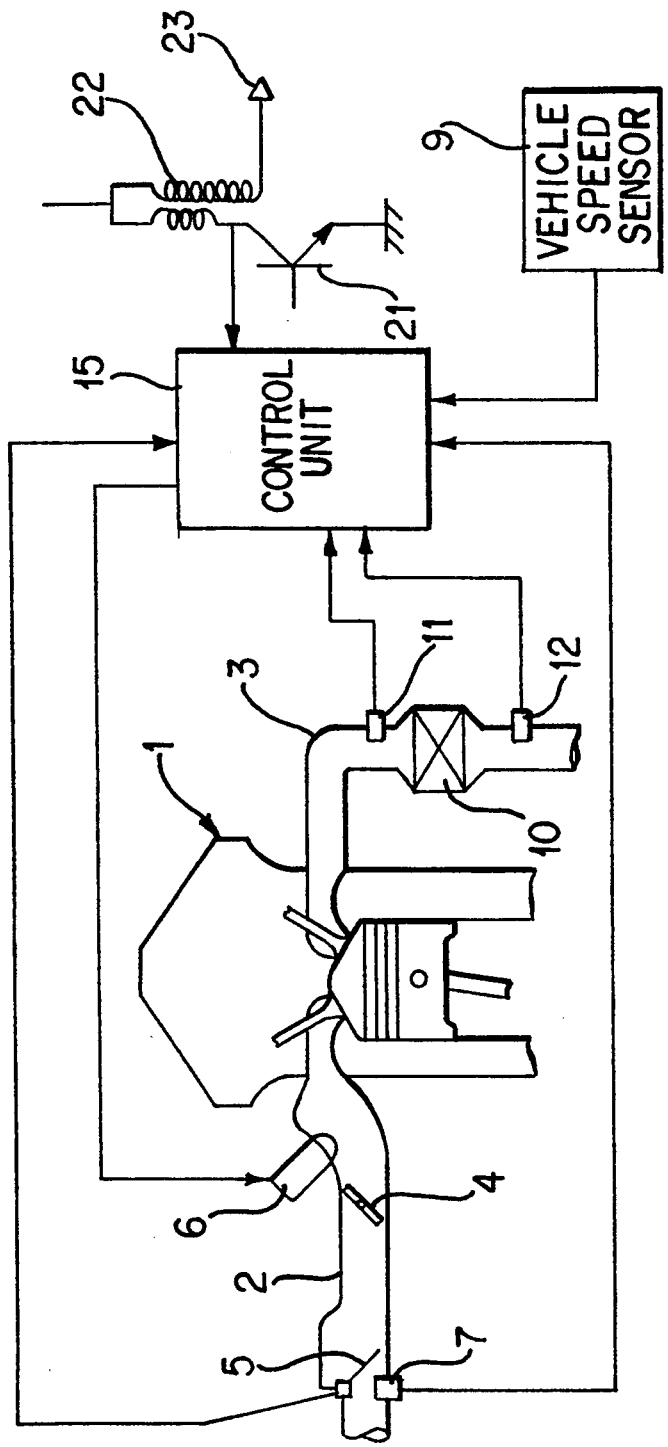
FIG. 1 is a schematic illustration showing an engine exhaust purification system in accordance with a preferred embodiment of the present invention.

Referring to the drawings in detail, and, more particularly, to FIG. 1, an engine exhaust purification system for an automobile engine 1 with an exhaust gas purification system in accordance with a preferred embodiment of the present invention is schematically shown, which includes an intake passage or line 2 and an exhaust passage or line 3. The intake passage 2 is provided with a throttle valve 4, an air flow meter 5, a fuel injector 6 and an air temperature sensor 7. The exhaust passage 3 is provided with a catalytic converter 10 including a catalyst, such as catalytic converter using rhodium, for exhaust gas purification. There are further provided an oxygen sensor 11 disposed upstream from the catalytic converter 10 and an oxygen sensor 12 disposed downstream from the catalytic converter 10. These $O_2$ sensors 11 and 12 are well known in the art and may be of any known type. A vehicle speed sensor 9, which is well known in the art and may take any known form, is provided relating to the vehicle. In association with the engine 1, there are provided an ignitor 21, an ignition coil 22 and a spark plug 13. Signals from all of the sensors, i.e. the air flow meter 5, the air temperature sensor 7, the oxygen sensors 11 and 12 and the vehicle velocity sensor 9, are input into a control unit 15 including a general purpose internal microcomputer. On the basis of the signals, the control unit 15 performs various controls and detections, such as a fuel injection control, an air-fuel ratio control, the detection of catalyst deterioration, and the detection of oxygen sensor deterioration. One of the two oxygen sensors 11 and 12, i.e. the upstream oxygen sensor 11, is utilized for the control of air-fuel ratio and for the detection of catalyst deterioration. The other one, i.e. the downstream oxygen sensor 12 is utilized for only the detection of catalyst deterioration.

The various controls and detections, performed by the control unit 15, will be hereafter described with reference to FIGS. 2 and 3, which are flow charts illustrating various routines and subroutines for the microcomputer of the control unit 15. Programming a computer is a skill well understood in the art. The following description is written to enable a programmer having ordinary skill in the art to prepare an appropriate program for the microcomputer. The particular details of any such program would of course depend upon the architecture of the particular computer selected.

Figure 2B:
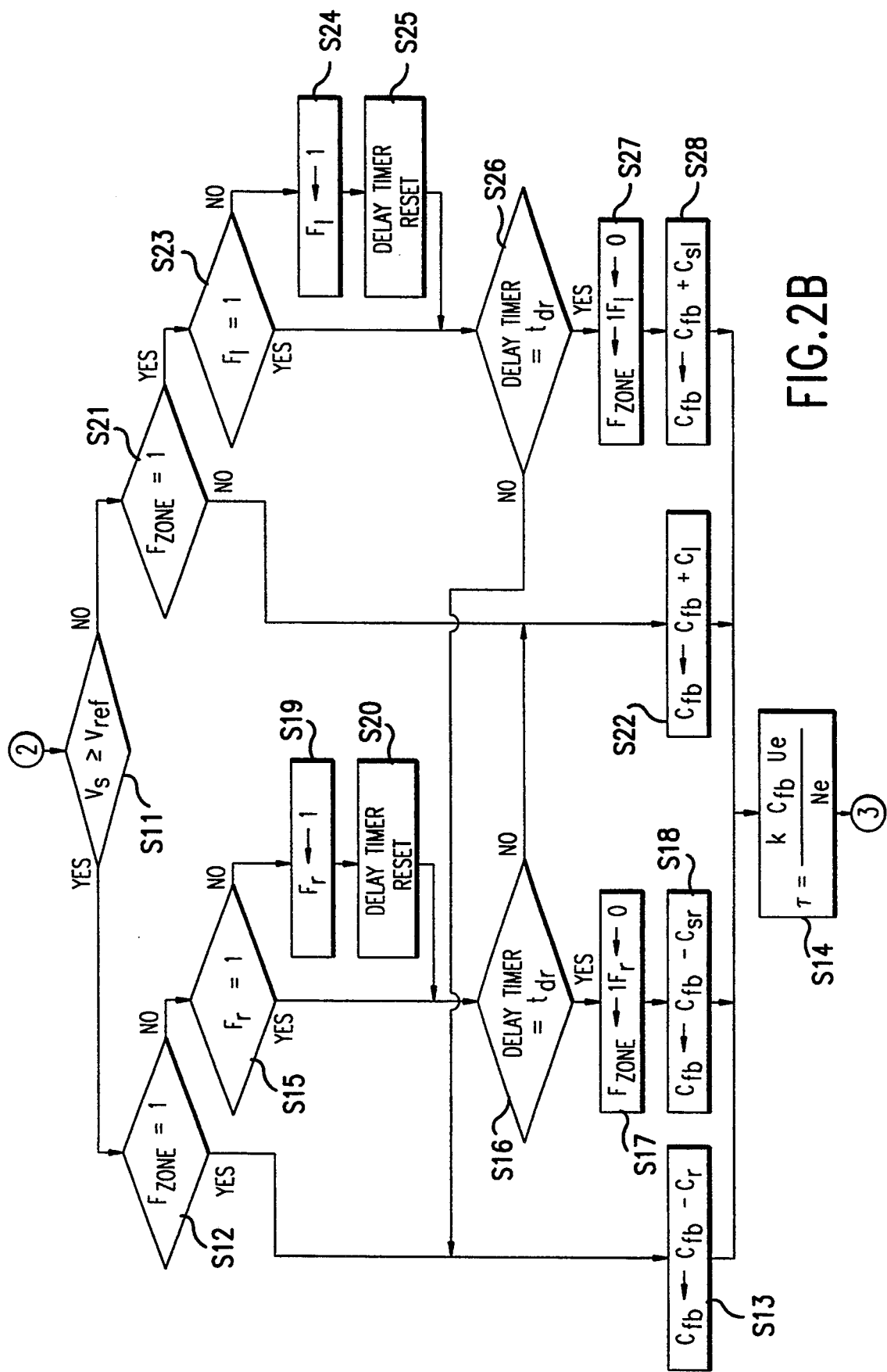
FIG. 2 is a flow chart illustrating a main sequential routine of a catalyst deterioration detection in the engine exhaust purification system shown in FIG. 1.
Figure 2C:
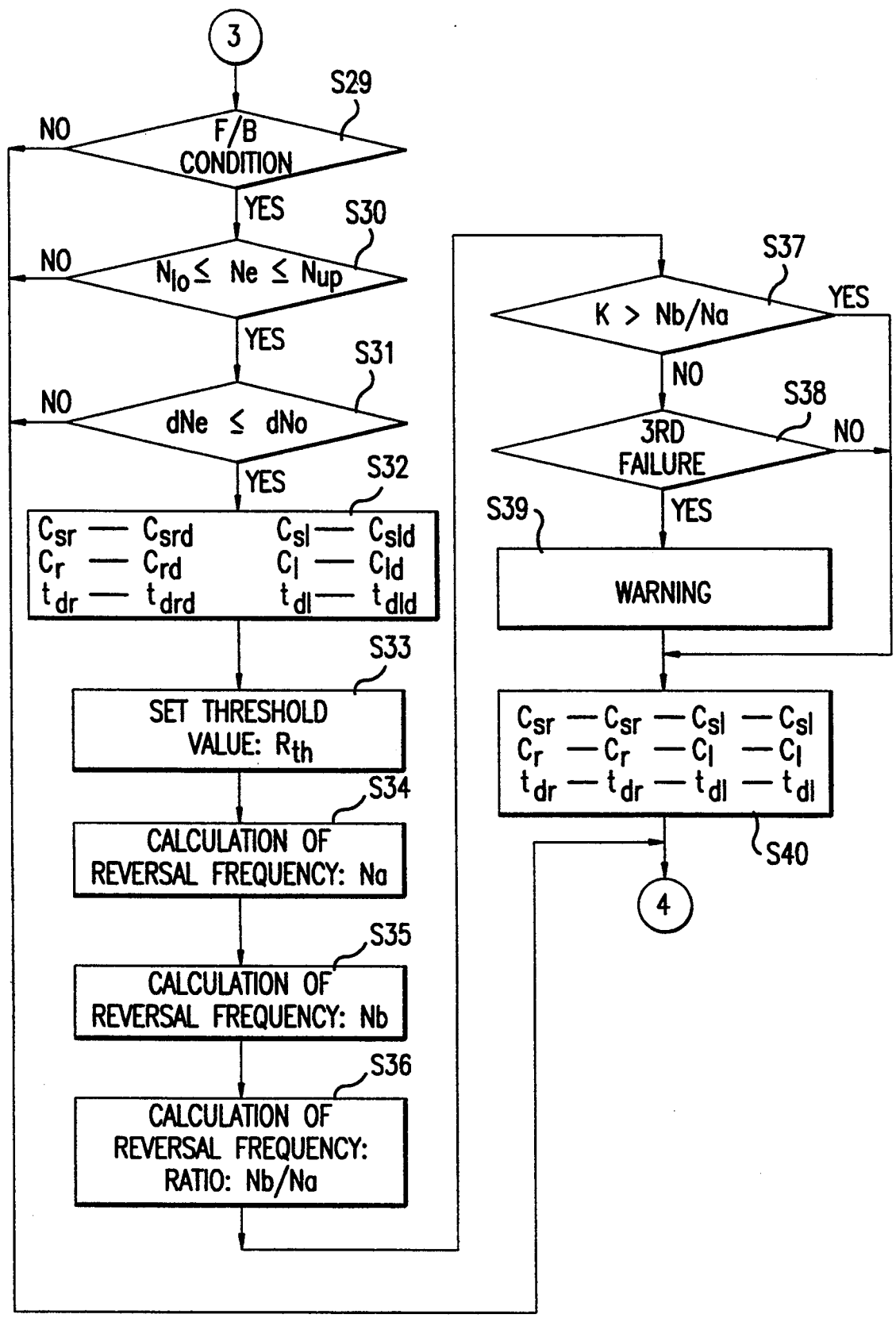

Referring to FIG. 2, which is a flow chart of the main routine of catalyst deterioration detection, the first step at step S1 in FIG. 2A, after resetting the microcomputer, is to set various flags, such as a zone flag $F_{zone}$, delay flags $F_l$ and $F_r$, and a feedback control coefficient $C_{fb}$. The zone flag $F_{zone}$, which is utilized to recognize an air-fuel ratio between a rich zone and a lean zone, is set to "1" representing the lean zone or to "0" representing rich zone. The delay flags $F_l$ and $F_r$, which respectively represent lean and rich and which are utilized to recognize whether or not fuel injection is being delayed, are set to "1" during delaying fuel injection and are set to "0" when no delaying of fuel injection takes place. The feedback control coefficient $C_{fb}$ is utilized to determine the relationship between fuel injection time and engine speed. Specifically, at step S1, all of these flags $F_{zone}$, $F_l$ and $F_r$ are set to "0," and the feedback control coefficient $C_{fb}$ is set to "1." Subsequently, at step S2, a base timer, which establishes a fixed cycle of engine speed calculation, is reset. The base timer is of the type which begins to count time at the moment the timer is reset.

Thereafter, a decision is made at step S3 whether or not the base timer has counted a fixed time T. This decision is repeated until the time T has been counted up. When the answer to the decision is "YES," then, after resetting the base timer again at step S4, a calculation is made, at step S5, to determine the speed Ne of the engine 1 from ignition pulses which are provided by the ignitor 21. Simultaneously with or immediately after the calculation of engine speed Ne, calculations are made, at step S6, to determine the amount of intake air Ue from signals from the air flow meter 5 and the air temperature sensor 7. At step S7, a central value $V_{ref}$ of slice level is obtained, as a target level of the output of the upstream oxygen sensor 11 relating to a target air-fuel ratio, with reference to a look-up table of central slice levels (not shown). Subsequently, the air-fuel feedback control is conducted through steps S8-S28.

In the air-fuel feedback control, a decision is made at step S8 whether or not the zone flag $F_{zone}$ has been set to "0." This decision is made in order to determine a hysteresis (dead band) of a target electromotive voltage of the upstream oxygen sensor 11 for noise-proof. When the answer to the decision is "YES," i.e. the zone flag $F_{zone}$ has been set to "0," this indicates that the current air-fuel ratio is within the lean zone, then, at step S9, a slice level central value $V_{ref}$ is renewed by adding the width of dead band $V_{h1}$ on lean side to the previous slice level central value $V_{ref}$. On the other hand, when the answer to the decision is "NO," this indicates that the current air-fuel ratio is within the rich zone, then, at step S10, a slice level central value $V_{ref}$ is renewed by subtracting the width of dead band $V_{hr}$ on rich side to the previous slice level central value $V_{ref}$. After the renewal of slice level central value $V_{ref}$ at step S9 or at step S10, a decision is made at step S11 whether or not an actual electromotive voltage $V_s$ actually obtained from the upstream oxygen sensor 11 is equal to or larger than the slice level central value $V_{ref}$. If the answer to the decision is "YES," then, a decision is made at step S12 whether or not the zone flag $F_{zone}$ has been set to "1." If the answer to the decision is "YES," this indicates that the air-fuel ratio is assumed to be on rich side more than the target air-fuel ratio, then, at step S13, the feedback control coefficient $C_{fb}$ is renewed by subtracting an integrating constant $C_r$ from the previous feedback control coefficient $C_{fb}$ so as to make the air-fuel ratio more lean. Subsequently, at step S14, a calculation is made to determine an injection pulse width $\tau$ which is a measurement of how long the injector is kept open. This calculation is made as follows:

$$\tau = \frac{kC_{fb}U_e}{N_e}$$

Figure 4:
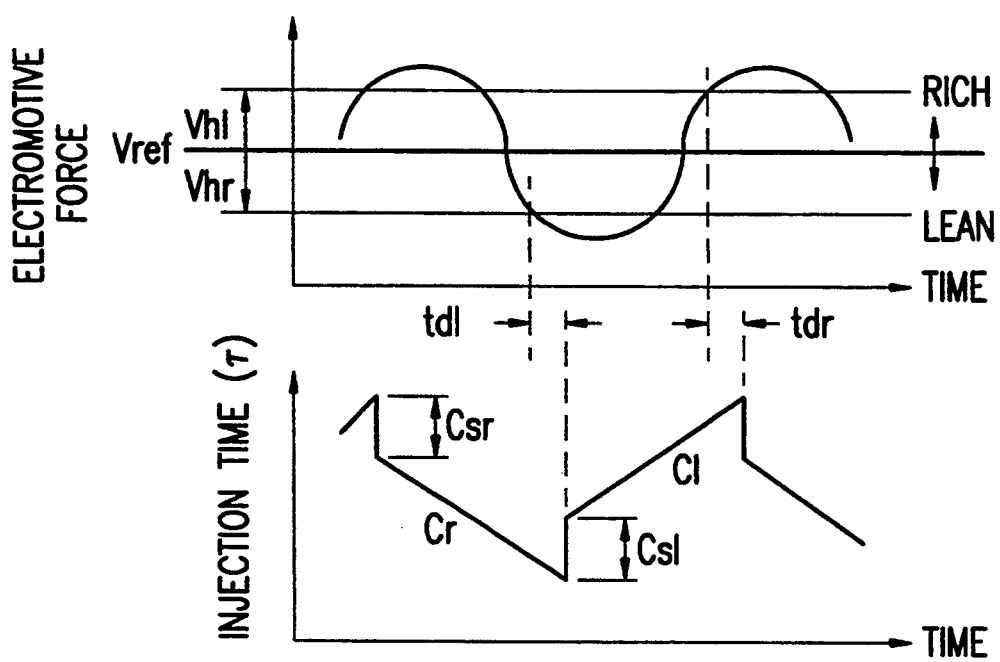
FIG. 4 is a diagram showing a correlation between an output of oxygen sensor and a fuel injection control.

As the result of reducing of the feedback control coefficient $C_{fb}$, the air-fuel ratio is gradually changed lean, as shown in FIG. 4. This lowers the actual electromotive voltage $V_s$ of the upstream oxygen sensor 11 and makes the answer to the decision made at step S11 "NO." When in fact the answer to the decision becomes "NO," this indicates that the actual electromotive voltage $V_s$ has become less than the current feedback control coefficient $C_{fb}$, then, at step S21, a decision is made whether or not the zone flag $F_{zone}$ has been set to "1." However, at this moment, since the air-fuel ratio is on the rich zone, the answer is "YES." Then, at step S23, a decision is made whether or not the delay flag $F_1$ has been set to "1". When the delay flag $F_1$ has not been set to "1," this indicates that delaying of fuel injection is not executed and the air-fuel ratio is judged to have changed from the rich zone to the lean zone, then, after setting the delay flag $F_1$ to "1" at step S24, an internal delay timer is reset by means of the throttle degree opening sensor 25. On the other hand, when if the delay flag $F_1$ has been set to "1," this indicate that fuel injection is in the process of delay, then, at step S26, a decision is made whether or not the delay timer has counted a specified delay time $t_{d1}$. If the answer to the decision is "NO," then at in step S13, the feedback control coefficient $C_{fb}$ is held as $C_{fb}-C_r$ so as to prevent the influence of noise. As a result of a calculation made of injection pulse width $\tau$ at step S14, the time of fuel injection is shortened so as to reduce the amount of fuel to be injected. On the one hand, if the delayed time $t_{d1}$ has been counted, then, after setting both the zone flag $F_{zone}$ and the delay flag $F_1$ to "0" at step S27, the feedback control coefficient $C_{fb}$ is changed to $C_{fb}+C_{s1}$ (where $C_{s1}$ is a proportional constant) so as to force the air-fuel ratio to the rich zone. As a result, the time of fuel injection is prolonged so as to increase the amount of fuel to be injected.

If, even with a prolongation of fuel injection time, the answer to the decision concerning the actual electromotive voltage $V_s$ of the upstream oxygen sensor 11 made is still less than the slice level central value $V_{ref}$, the answer to the decision made at step S21 is "NO," this indicates that the air-fuel ratio is in the lean zone, then, at step S22, the feedback control coefficient $C_{fb}$ is changed to $C_{fb}+C_1$ (where $C_1$ is an integration constant) so as to prolong the time of fuel injection at step S14.

With the progress of time, as a result of increasing of the amount of fuel injection, the actual electromotive voltage $V_s$ of the upstream oxygen sensor 11 becomes greater than the slice level central value $V_{ref}$, and the answer to the decision made at step S21 is "YES," this indicates that the air-fuel ratio has entered into the rich zone. However, at this time, the zone flag $F_{zone}$ has been set to "0," the answer to the decision made at step S12 is "NO," then, at step 15, a decision is made whether or not the delay flag $F_r$ has been set to "1." If the answer to the decision is "YES," this indicate that fuel injection is in the process of delay, then, at step S16, a decision is made whether or not the delay timer has counted a specified delay time $T_{dr}$. If the answer to the decision is "NO," then at step S22, the feedback control coefficient $C_{fb}$ is held as $C_{fb}+C_1$ so as to prevent the influence of noise. As a result of a calculation made of injection pulse width $\tau$ at step S14, the time of fuel injection is prolonged so as to increase the amount of fuel to be injected. On the one hand, if the delayed time $t_{dr}$ has been counted, then, after setting the zone flag $F_{zone}$ to "1," and the delay flag $F_1$ to "0" at step S17, the feedback control coefficient $C_{fb}$ is changed to $C_{fb}-C_{sr}$ (where $C_{sr}$ is a proportional constant) so as to force the air-fuel ratio to the lean zone at step S18. As a result, the time of fuel injection is shortened so as to decrease the amount of fuel to be injected at step S14. However, if the answer to the decision made at step S15 is "NO," this indicates that the air-fuel ratio has entered into the rich zone, then, after setting the delay flag $F_r$ to "1" at step S19 and resetting the delay timer at step S20, the steps S16 to S18 are taken so as to decrease the amount of fuel to be injected at step S14. Immediately after the determination of a fuel injection time $\tau$ at step S14, interrupt routines (I) and (II), depicted as flow charts in FIG. 3, are called with the rise of an ignition pulse from the ignitor 21 and operate to suspend the on-going routine.

Figure 3B:
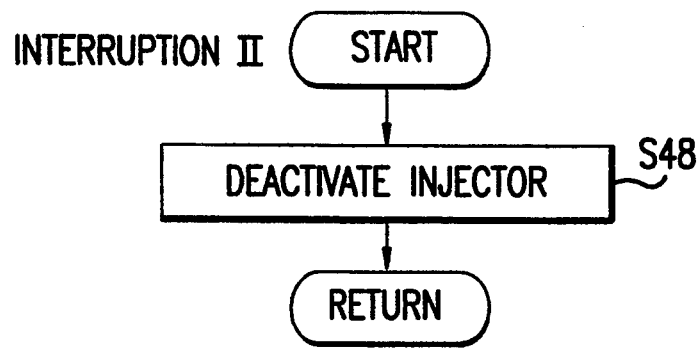
FIG. 3 are flow charts illustrating interruption subroutines of a fuel injection control.

In the interrupt routine (I) shown in FIG. 3A, an internal injection timer is set to the fuel injection time $\tau$ at step S46, and, immediately thereafter, the injector 6 is activated to inject fuel at step S47. In the interrupt routine (II) shown in FIG. 3B, when the internal injection timer counts down the fuel injection time $\tau$, the injector 6 is deactivated to finish fuel injection at step S48. Activation and deactivation of the injector 6 are, respectively completed by turning on and off a power source (not shown) for the injector 6.

Subsequent to fuel injection, the deterioration detection of the catalytic converter and the oxygen sensors is conducted. At first, examined through steps 29–31 are various vehicle driving conditions for conducting the deterioration detection of the catalytic converter. If all of the vehicle driving conditions are satisfied, the deterioration detection of the catalytic converter is actually conducted. That is, decisions are subsequently made whether or not a current engine operating condition is in a feedback control (F/B) region at step S29, whether or not a current vehicle speed $N_v$ is within specified upper and lower limits $N_{up}$ and $N_{lo}$ at step S30, and whether or not a change rate of vehicle speed (dNe) is less than a specified rate (dNo) at step S31. If the answers to all of these decisions made at S29–S31 are "YES," it is judged that the deterioration detection of catalytic converter is ready to be appropriately conducted. This is because, even if an engine operating condition is in the feedback control region, during a vehicle driving condition, such as an acceleration, in which there are great changes in air fuel ratio, it is not anticipated that an accurate detection of deterioration can be obtained. Therefore, it is essential to conduct the deterioration detection of catalytic converter in a specific region of vehicle driving conditions in which there are no great changes in air-fuel ratio. When the requisite conditions for the deterioration detection of catalytic converter are realized, then, at step S32, the feedback control coefficients $C_{sr}$, $C_{sl}$, $C_r$ and $C_l$ and the delay times $t_{dr}$ and $t_{dl}$ are, respectively substituted by specific feedback control coefficients $C_{sr}$, $C_{sl}$, $C_r$ and $C_l$, and specific delay times $t_{dr}$ and $t_{dl}$ distinctive to the deterioration detection of catalytic converter. This is because the feedback control coefficients are decreased so as to prevent hurting of air-fuel ratio and, thereby, to accomplish the deterioration detection of catalytic converter in a stable manner.

Thereafter, at step S33, a threshold level $R_{th}$, which is the standard of measurement of reversal frequency of an output signal from each of the oxygen sensors 11 and 12, is established. Then, the number of reversals Na, or the reversal frequency, of an output signal of the upstream oxygen sensor 11 is counted at step S34, and the number of reversals Nb, or the reversal frequency, of an output signal of the downstream oxygen sensor 12 is counted at step S35. Then, after calculating the ratio (Nb/Na) between the output reversal frequencies Na and Nb at step S36, a decision is made at step S37 whether or not the reversal frequency ratio (Nb/Na) is less than a critical ratio K. If the answer to the decision is "YES," the catalyst 10 still has a sufficient capacity of oxygen occlusion, and, accordingly, is supposedly determined or judged to have been deteriorated. Conversely, if the answer to the decision is "NO," i.e. if the reversal frequency ratio (Nb/Na) is greater than the critical ratio K, then, the catalyst 10 has greatly reduced its capacity of oxygen occlusion and is supposedly determined or judged to have been deteriorated. However, since errors may occur depending upon vehicle driving conditions, the determination of catalyst deterioration is made only when the "NO" answer has been provided three consecutive times. For this reason, a decision is made at step S38 whether or not there are three consecutive "NO" answers. If the reversal frequency ratio (Nb/Na) is determined to be smaller than the critical ratio K at step S37, or if the "NO" answer to the decision made at step S37 is first or second, these indicate that the catalyst 10 is functionally proper, then, at step S40, the ordinary feedback control coefficients $C_{sr}$, $C_{sl}$, $C_r$ and $C_l$ and the ordinary delay times $t_{dr}$ and $t_{dl}$, distinctive to the ordinary operation, are reset. However, If the answer to the decision made at step S37 is "NO," this indicates that the catalyst 10 has been functionally deteriorated, and the "NO" answer is third, then, after turning on a warning lamp, indicating that the catalyst 10 has been deteriorated, at step S39, the ordinary feedback control coefficients $C_{sr}$, $C_{sl}$, $C_r$ and $C_l$ and the ordinary delay times $t_{dr}$ and $t_{dl}$ are reset at step S40.

As was previously described, in this instance, in the event that the catalyst deterioration detection is accomplished on the basis of output signals from the upstream and downstream oxygen sensors 11 and 12, there is no problem when the oxygen sensors 11 and 12 have not yet been deteriorated and provide a normal level of output signals, and, accordingly, a decision is made with respect to the catalyst deterioration detection with a high accuracy and reliability. However, if the oxygen sensors 11 and 12 have themselves deteriorated, then, errors are introduced into the catalyst deterioration detection, which results in adversely affecting the high accuracy and reliability of the catalyst deterioration detection. Because of this, in the engine exhaust purification system of this invention, the catalyst deterioration detection is accompanied by a detection concerning the deterioration of oxygen sensor. That is, appropriate correction corresponding to deterioration of the oxygen sensor is made for the reversal frequency ratio (Na/Nb) based on which the catalyst deterioration detection is made. This correction makes the catalyst deterioration detection with a high accuracy and reliability. In particular, in this embodiment, the output of the downstream oxygen sensor 12 is monitored to detect a drop or reduction in output voltage of the downstream oxygen sensor 12, and the drop is used as a primary factor in correcting of a reversal threshold level for the deterioration detection of the downstream oxygen sensor 12.

Figure 5:
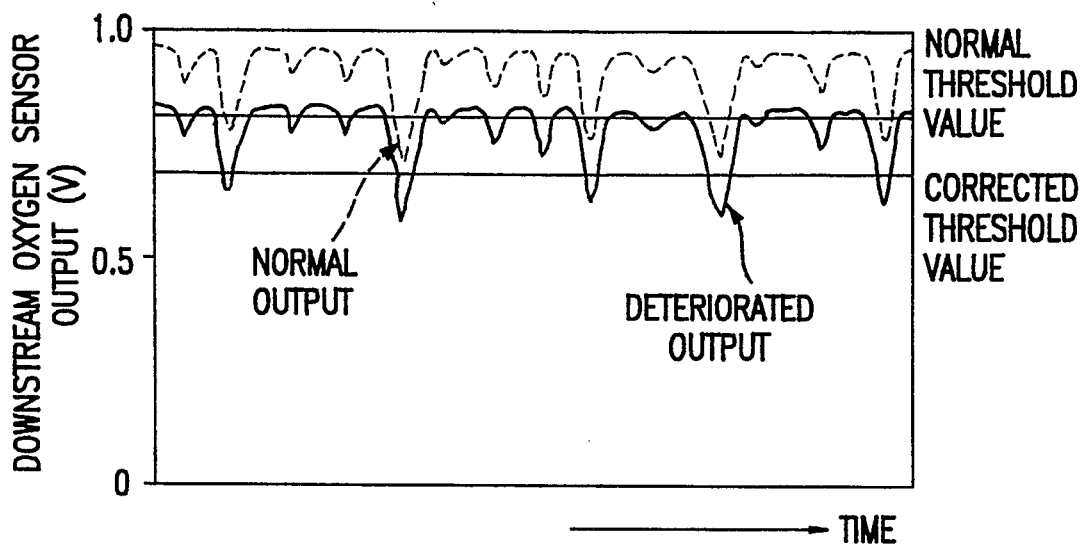
FIG. 5 is a diagrammatic illustration of correcting of a reversal threshold level.

Specifically, as shown in FIG. 2D, which illustrates a flow chart of the reversal threshold value correction, a decision is made at step S41 whether or not a specified condition for detecting of the downstream oxygen sensor 12 has been satisfied. If the answer to the decision is "YES," then, a feedforward or open loop control is conducted so as to change the air-fuel ratio into the rich zone at step S42. Thereafter, the output voltage $E_d$ of the downstream oxygen sensor 12 is sampled at step S43, and then, a calculation is made at step S44 to obtain the difference between the sampled output voltage $E_d$ and the normal output voltage $E_s$ of the downstream oxygen sensor 12 as a drop or reduction $E_m$ ($E_s - E_d$) in output of the downstream oxygen sensor 12. Subsequently, a correction of the reversal threshold value is made corresponding to the drop or reduction $E_m$ of the output of the downstream oxygen sensor 12 with reference to a corrective threshold value map (not shown) at step S45. Specifically, as shown in FIG. 5, corresponding to the drop or reduction $E_m$ of the output of the downstream oxygen sensor 12, the reversal threshold value is lowered as a corrected threshold valve so as to move the air-fuel ratio toward the lean zone.

In this manner, changing or lowering the reversal threshold value so as to move the air-fuel ratio toward the lean zone prevents a drop or reduction in accuracy of the catalyst deterioration detection due to the deterioration of the downstream oxygen sensor 12 accompanying a drop or reduction in output. In other words, in the normal state in which there is no deterioration of the downstream oxygen sensor 12, the output manifests a high voltage of output and an appropriate number of reversals with respect to the normal reversal threshold value, as is shown by a broken line in FIG. 5. However, in the event the output is reduced or lowered due to the deterioration of the downstream oxygen sensor 12 as is shown by a solid line in FIG. 5, if the reversal threshold value is maintained at the normal reversal threshold value, the number of reversals or reversal frequency of the output of the downstream oxygen sensor 12 is greatly increased. This indicates that the reversal frequency ratio (Nb/Na) which is the fundamental factor for the catalyst deterioration detection becomes greater after the deterioration of the downstream oxygen sensor 12 than before the deterioration of the downstream oxygen sensor 12, i.e. during the normal state of the downstream oxygen sensor 12. Consequently, if the reversal frequency ratio (Nb/Na) is used without changing of the reversal threshold value for the catalyst deterioration detection through steps S33–37, the catalyst 10 is erroneously judged to have deteriorated, notwithstanding the fact that it is still appropriately active without deterioration. In this instance, correctly changing of the reversal threshold value toward the lean zone despite there is a reduction in output of the downstream oxygen sensor 12, the downstream oxygen sensor 12 exhibits the same number of reversals as it did in the normal state, thereby enabling the catalyst deterioration detection with the same high accuracy and reliability as was the case for the downstream oxygen sensor 12 during the normal state.

Figure 7:
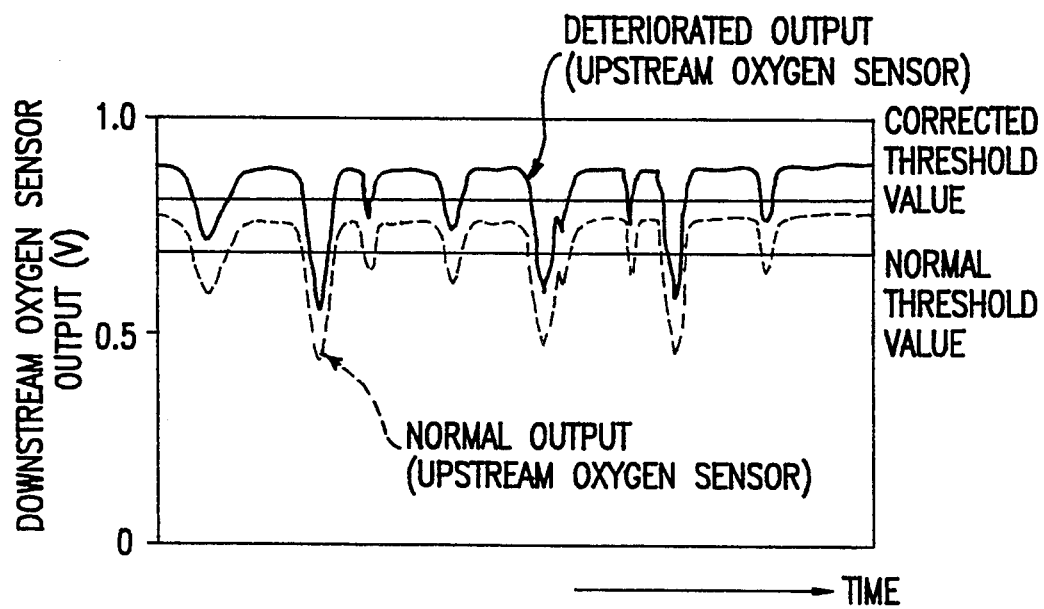
FIG. 7 is a diagrammatic illustration of correcting of a reversal threshold level in the engine exhaust purification system of FIG. 6.
Figure 6:
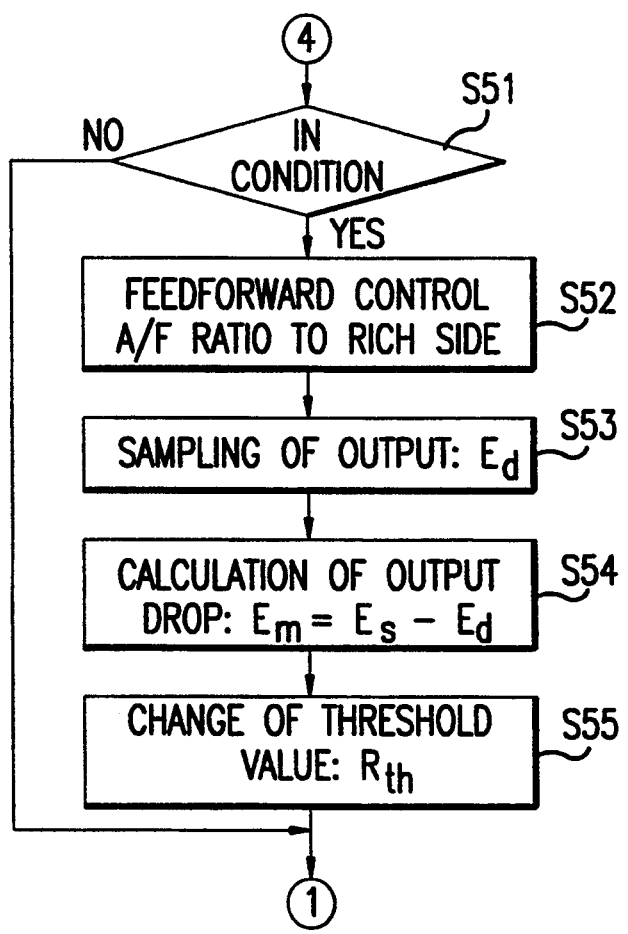
FIG. 6 is a part of a flow chart illustrating a main sequential routine of a catalyst deterioration detection in an engine exhaust purification system in accordance with another preferred embodiment of the present invention.

Referring to FIGS. 6 and 7, an engine exhaust purification system in accordance with another preferred embodiment of the present invention is shown, in which the deterioration detection of the downstream oxygen sensor 12 and the determination of reversal frequency ratio are different from those of the primary embodiment in which a drop or reduction in output voltage of the upstream oxygen sensor 11 due to deterioration is used as a primary factor in correcting of a reversal threshold level for determining a reversal frequency ratio. Specifically describing, if there is detected a drop or reduction in output voltage of the upstream oxygen sensor 11, then an output of the upstream oxygen sensor 11 provides an indication of a false air-fuel ratio which is closer to the lean zone than an air-fuel ratio actually defined by the output. Consequently, the air-fuel ratio is controlled so as to enrich the fuel mixture, being accompanied by the strong tendency of output of the downstream oxygen sensor 12 to hold the air-fuel ratio toward the rich zone. As a result, if the reversal threshold value of the downstream oxygen sensor 12 is maintained at the normal reversal threshold value, as the output of the upstream oxygen sensor 11 drops or is reduced, the number of reversals or reversal frequency of the downstream oxygen sensor 12 is lowered or reduced. Consequently, when the catalyst deterioration detection is made based upon the reversal frequency ratio (Nb/Na) of the upstream and downstream oxygen sensors 11 and 12, the catalyst 10 may erroneously be judged to have not deteriorated, even it has deteriorated to some extent defined by a reduction in reversal frequency ratio (Nb/Na). This is evident from FIG. 7.

Referring to FIG. 7, in order to avoid such an erroneous catalyst deterioration detection resulting from a drop or reduction in output voltage of the upstream oxygen sensor 11, if there is a drop or reduction in output voltage of the output from the upstream oxygen sensor 11, a correction of reversal threshold value is made for the output from the downstream oxygen sensor 12 only by a specified voltage, which corresponds to the degree of deterioration of the upstream oxygen sensor 11, toward the rich zone from the normal reversal threshold value. This correction of reversal threshold value maintains the number of reversals or reversal frequency of the output of the downstream oxygen sensor 12 is maintained to be the same as when there is no deterioration of the upstream oxygen sensor 11.

The correction procedure of reversal threshold value for the output from the downstream oxygen sensor 12 will be understood by reviewing FIG. 6, which is a flow chart illustrating the reversal threshold value correction routine.

As shown in FIG. 6, a decision is made at step S51 whether or not a specified condition for detecting of the downstream oxygen sensor 12 has been satisfied. If the answer to the decision is "YES," then, a feedforward or open loop control of air-fuel ratio is conducted so as to change the air-fuel ratio in to the rich zone at step S52. Thereafter, the output voltage $E_d$ of the upstream oxygen sensor 11 is sampled at step S53, and then, a calculation is made at step S54 to obtain the difference between the sampled output voltage $E_d$ and the normal output voltage $E_s$ of the upstream oxygen sensor 11 as a drop or reduction $E_m$ ($E_s-E_d$) in output of the upstream oxygen sensor 11. Subsequently, a correction of the reversal threshold value is made corresponding to the drop or reduction $E_m$ of the output of the upstream oxygen sensor 11 with reference to a map of correction value (not shown) at step S55.

In this manner, through correcting of the reversal threshold value for the downstream oxygen sensor 12 toward the rich side corresponding to a drop or reduction in output voltage which accompanies a deterioration of the upstream oxygen sensor 11, even if there is a deterioration of the upstream oxygen sensor 11, the downstream oxygen sensor 12 provides an output of the same number of reversals or reversal frequency as when there is no deterioration of the upstream oxygen sensor 11. Consequently, the reversal frequency ratio (Nb/Na) is unchanged between when the upstream oxygen sensor 11 has deteriorated and when it has no deterioration, so that the catalyst deterioration detection is made with a high accuracy and reliability even when there is a drop or reduction in output of the upstream oxygen sensor 11 due to deterioration.

Figure 8:
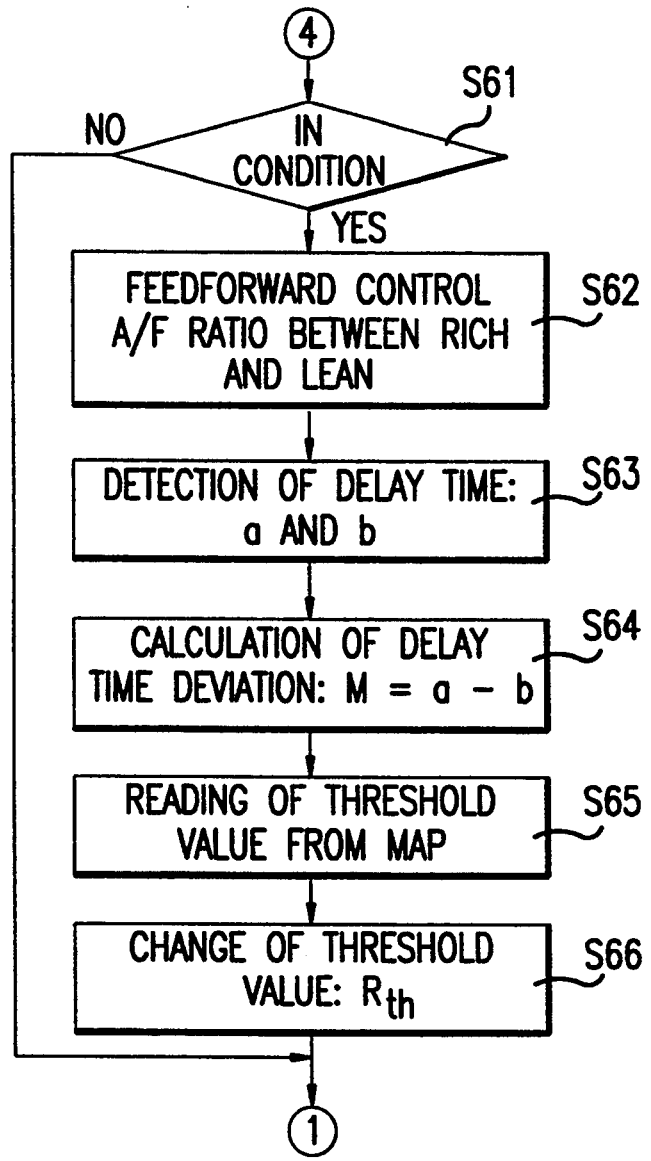
FIG. 8 is a part of a flow chart illustrating a main sequential routine of a catalyst deterioration detection in an engine exhaust purification system in accordance with a further preferred embodiment of the present invention.
Figure 9:
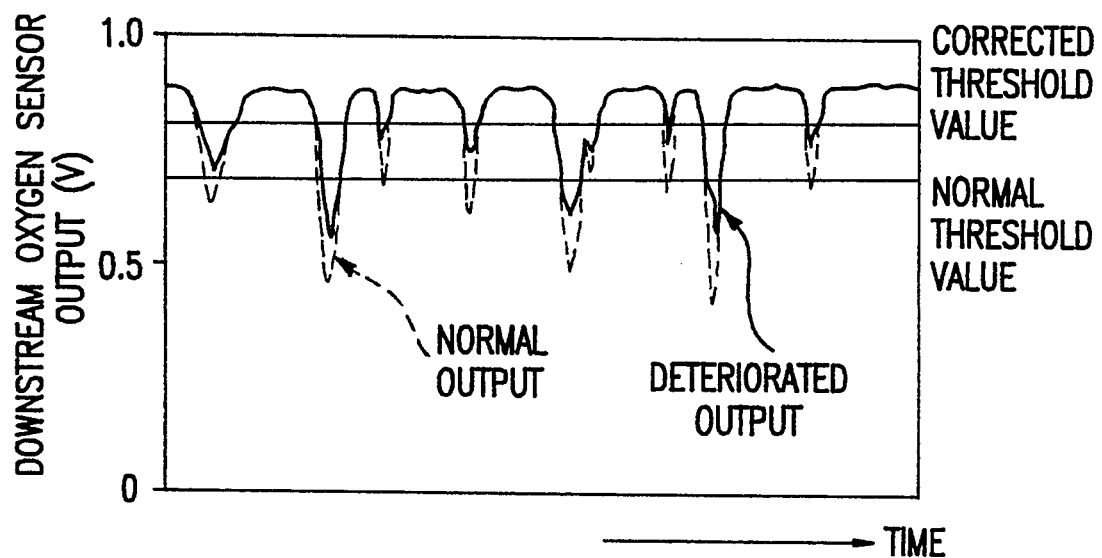
FIG. 9 is a diagrammatic illustration of correcting of a reversal threshold level in the engine exhaust purification system of FIG. 8.

Referring to FIGS. 8 and 9, an engine exhaust purification system in accordance with still another preferred embodiment of the present invention is shown, in which the deterioration detection of the downstream oxygen sensor 12 and the determination of reversal frequency ratio are different from those of the primary embodiment in which a drop or reduction in output voltage of the upstream oxygen sensor 11 due to deterioration is used as a primary factor in correcting of a reversal threshold level for determining a reversal frequency ratio. Specifically, The correction of a reversal threshold level for determining of the reversal frequency ratio is made based on a drop or reduction in responsiveness of the downstream oxygen sensor 12.

As was previously described, if the downstream oxygen sensor 12 has a deterioration of responsiveness, i.e. a delay of response, the downstream oxygen sensor 12 can not provide an output quickly following a change in air-fuel ratio, and provides an output which has an amplitude smaller than that of an output corresponding to a changing air-fuel ratio. Such a reduction in amplitude causes a decrease in reversal frequency of an output of the downstream oxygen sensor 12 with respect to the normal reversal threshold level. This also leads to an erroneously judgement of deterioration of the catalyst accomplished on the basis of a reversal frequency ratio (Nb/Na) between reversal frequencies $N_a$ and $N_b$ of outputs of the upstream and downstream oxygen sensors 11 and 12.

In order to avoid such an erroneous catalyst deterioration detection resulting from a drop or reduction in responsiveness of the downstream oxygen sensor 12, if there is a drop or reduction in responsiveness of from the downstream oxygen sensor 12, a correction of reversal threshold value is made for the output from the downstream oxygen sensor 12 toward the rich zone from the normal reversal threshold value so as to provide the same number of reversals or reversal frequency of an output of the downstream oxygen sensor 12 as when the upstream oxygen sensor 11 is in its normal state as shown in FIG. 9.

The correction procedure of reversal threshold value for an output from the downstream oxygen sensor 12 will be understood by reviewing FIG. 8, which is a flow chart illustrating the reversal threshold value correction routine.

Figure 10:
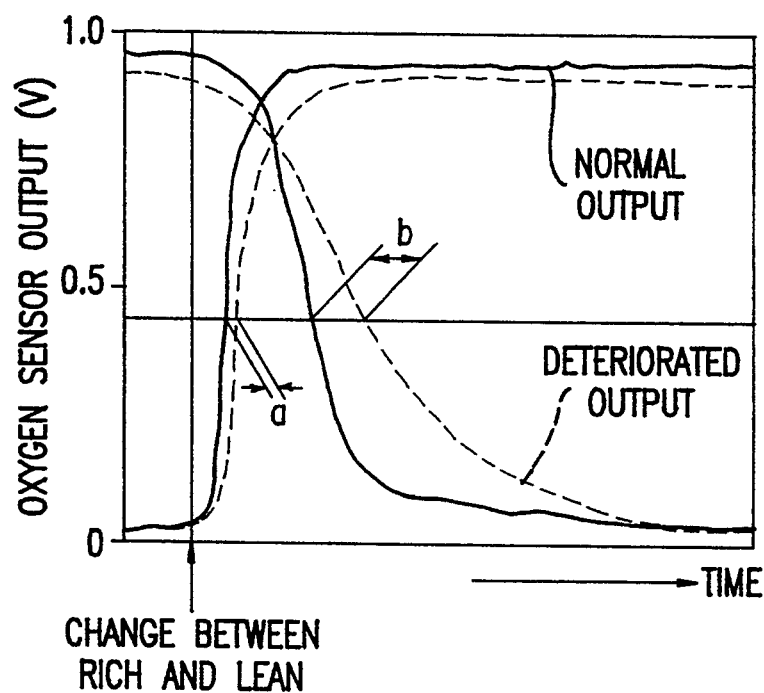
FIG. 10 is a diagrammatic illustration showing the detection of delay in responsiveness of an oxygen sensor of the engine exhaust purification system of FIG. 8.

Specifically, in the routine depicted in FIG. 8, after making a decision with respect to the conditions of deterioration detection of the downstream oxygen sensor 12 at step S61, when the conditions are realized, then, as shown in FIG. 10, an open loop air-fuel ratio control is accomplished in which the air-fuel ratio changes back and forth between rich and lean at step S62. In this instance, measurements are taken at step S63 of the response delay times a and b. Subsequently, at step S64, a deviation of response delay time M is calculated from the response delay times a and b. Finally, a correction is made to obtain a corrected reversal threshold value corresponding to the response delay time deviation M with reference to a corrective threshold value map at step S65. Finally, at step S66, the normal reversal threshold value is replaced with to the corrected reversal threshold value.

Correcting the reversal threshold value of the downstream oxygen sensor 12 toward a richer side enables the downstream oxygen sensor 12 to exhibit the same number of reversals or reversal frequency as it did in the normal state, thereby enabling the catalyst deterioration detection, based on the reversal frequency ratio (Nb/Na), with the same high accuracy and reliability as was the case for the downstream oxygen sensor 12 during the normal state.

Figure 11:
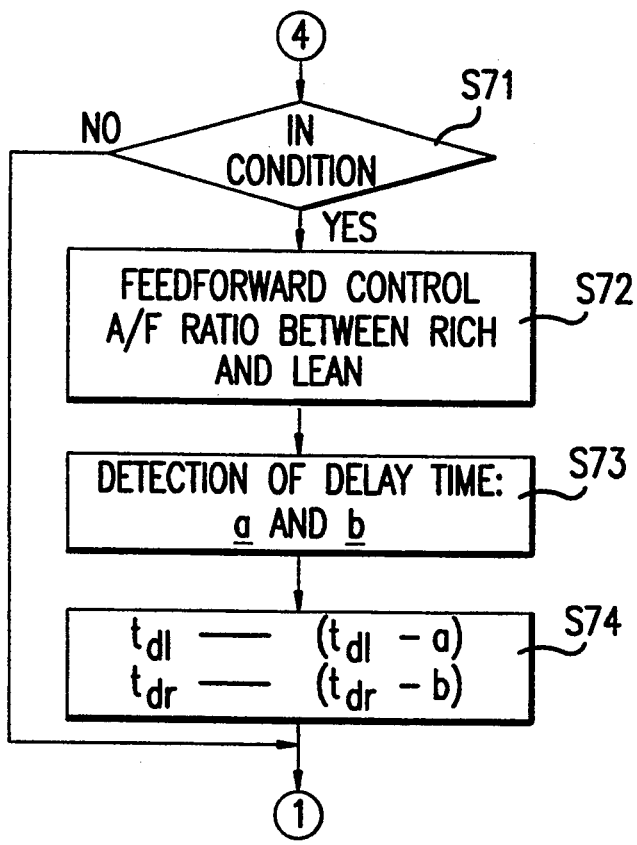
FIG. 11 is a part of a flow chart illustrating a main sequential routine of a catalyst deterioration detection in an engine exhaust purification system in accordance with a further preferred embodiment of the present invention.
Figure 12:
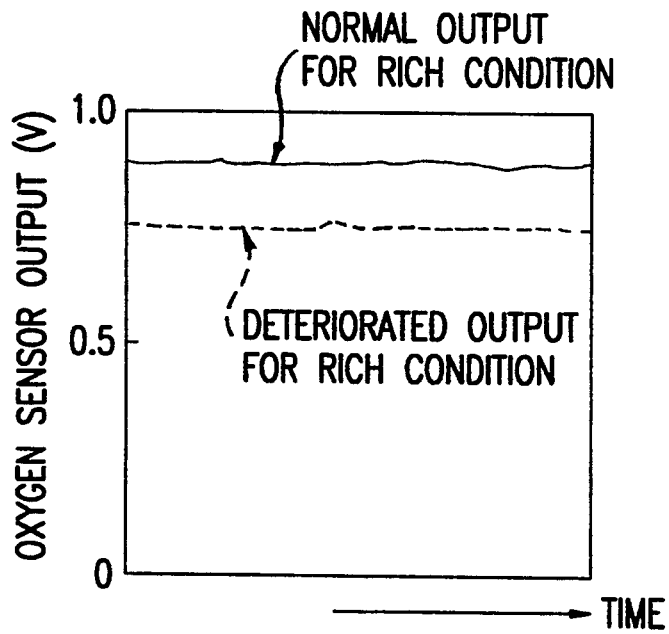
FIG. 12 is a diagrammatic illustration showing a drop in output of an oxygen sensor due to deterioration.
Figure 13:
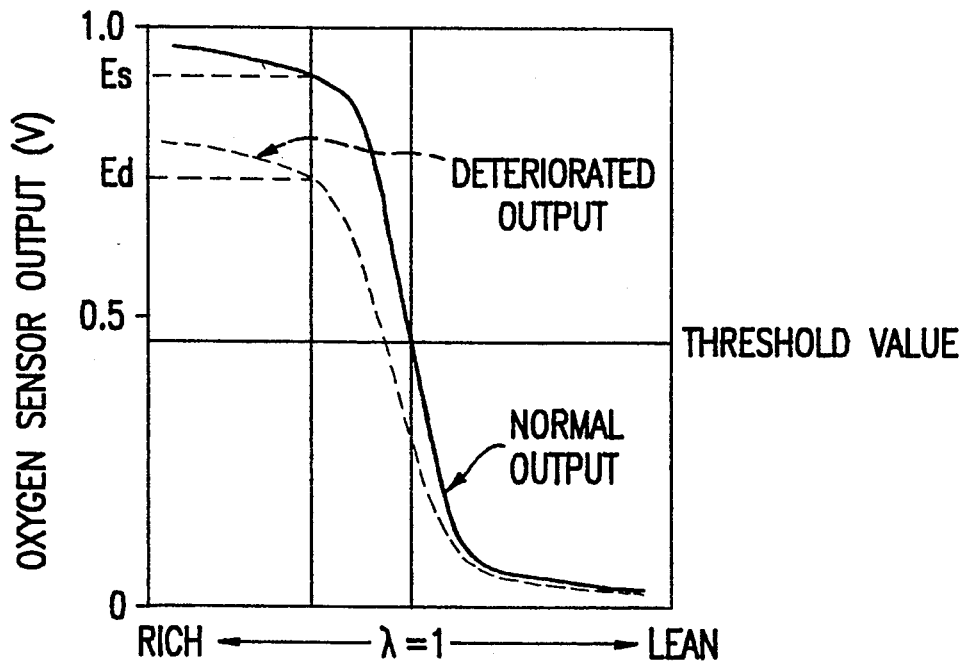
FIG. 13 is a diagrammatic illustration showing changes in output of an oxygen sensor due to deterioration with respect to air-fuel ratio.
Figure 14:
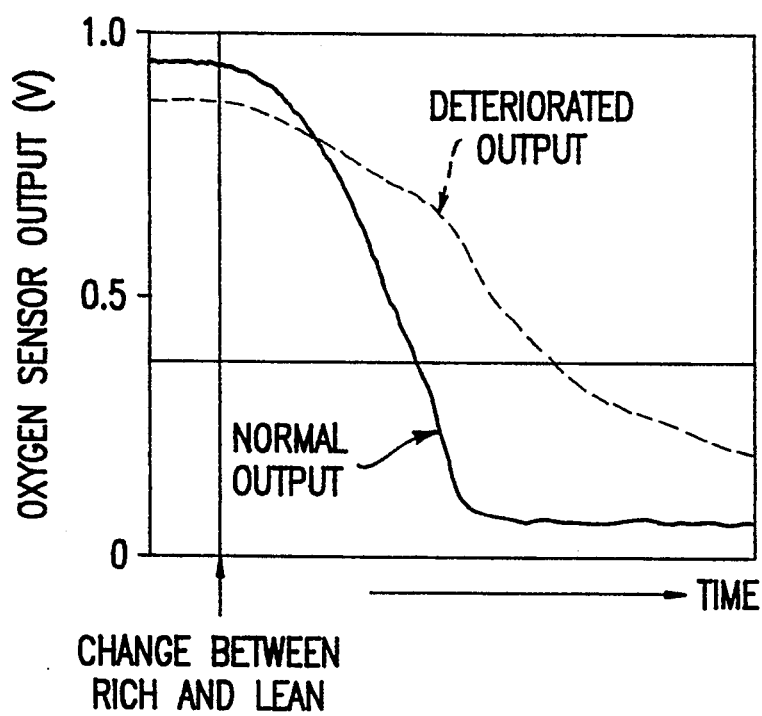
FIG. 14 is a diagrammatic illustration showing a delay in response of an oxygen sensor due to deterioration.
Figure 15:
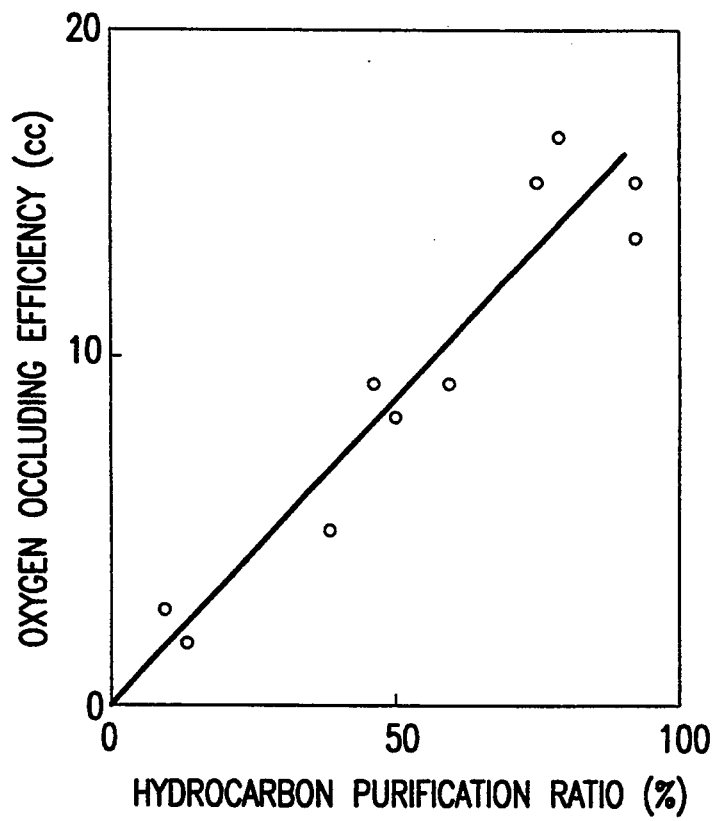
FIG. 15 is a diagram showing a relation between oxygen occluding performance and hydrocarbon (HC) purification ratio of a catalytic converter rhodium.
Figure 16:
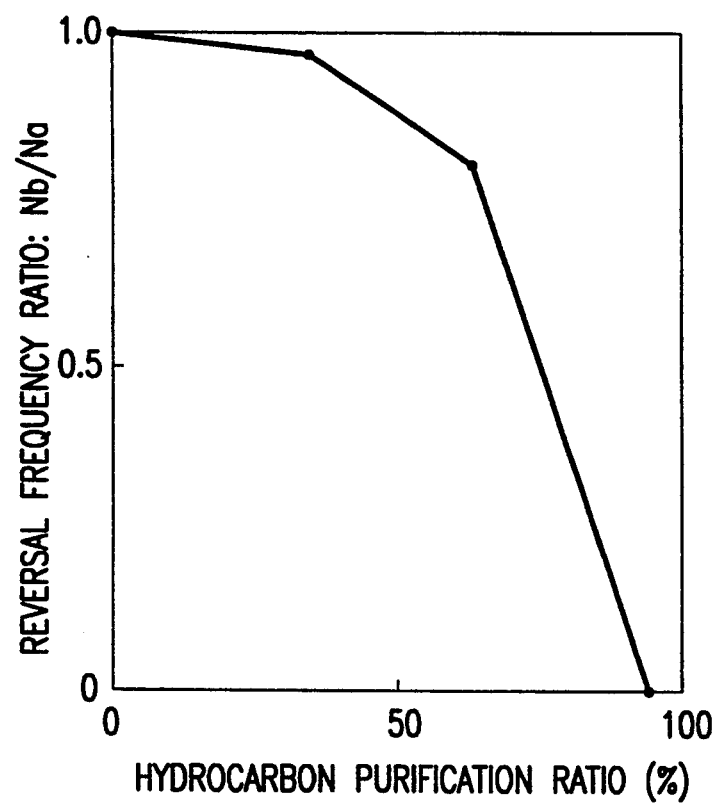
FIG. 16 is a diagram showing a relation between hydrocarbon (HC) purification ratio and reversal frequency ratio between oxygen sensors located upstream and downstream from a catalytic converter rhodium.

Referring to FIG. 11, an engine exhaust purification system in accordance with a further preferred embodiment of the present invention is shown, in which a feedback control coefficient is corrected to eliminate an erroneous deterioration detection caused due to a delay in response of the downstream oxygen sensor 12.

In the routine depicted in FIG. 11, after making a decision with respect to the conditions of deterioration detection of the downstream oxygen sensor 12 at step S71, when the conditions are realized, then, as shown in FIG. 10, an open loop air-fuel ratio control is accomplished in which the air-fuel ratio changes back and forth between rich and lean at step S72. In this instance, measurements are taken at step S73 of the response delay times a and b. Subsequently, at step S74, the delay times $t_{dl}$ and $t_{dr}$ of the air-fuel ratio feedback control are, respectively, reduced by the delay times a and b.

In this instance, the response delay of the downstream oxygen sensor 12 caused due to deterioration is cancelled by means of the delay times $t_{dl}$ and $t_{dr}$ of the air-fuel ratio feedback control, so as not to give any influence on the deterioration detection of the catalyst. In other words, a reduction in amplitude of an output of the downstream oxygen sensor 12, such as shown in FIG. 9, is prevented. As a result, the deterioration detection of the catalyst 10 is made with a high accuracy.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. An engine exhaust purification system, for an internal combustion engine, having an engine exhaust purifying catalyst in an exhaust line, said engine exhaust purification system comprising:

an upstream oxygen sensor disposed in the exhaust line upstream from the engine exhaust purifying catalyst;

a downstream oxygen sensor disposed in the exhaust line downstream from the engine exhaust purifying catalyst; and judging means for detecting an output ratio of an output from said upstream oxygen sensor to an output from said downstream oxygen sensor, for judging a deterioration of said catalyst based on said output ratio, for detecting a deterioration of each of said upstream and downstream oxygen sensors based on said outputs, respectively, and for correcting said output ratio when detecting a deterioration at least one of said upstream and downstream oxygen sensors.

2. An engine exhaust purification system as defined in claim 1, wherein said judging means calculates, as said output ratio, a frequency ratio of reverse of an output from said upstream oxygen sensor with respect to a first preselected threshold value to reverse of an output from said downstream oxygen sensor with respect to a second preselected threshold value.

3. An engine exhaust purification system as defined in claim 2, wherein said judging means changes said preselected threshold value of one of said upstream and downstream oxygen sensors according to a deterioration of said one of said upstream and downstream oxygen sensors, thereby correcting said frequency ratio of reverse.

4. An engine exhaust purification system as defined in claim 2, wherein said judging means changes said preselected threshold value of said downstream oxygen sensor according to a deterioration of said downstream oxygen sensor, thereby correcting said frequency ratio of reverse.

5. An engine exhaust purification system as defined in claim 2, wherein said judging means changes said preselected threshold value of said downstream oxygen sensor according to a deterioration of said downstream oxygen sensor so as to provide an air-fuel ratio by which a fuel mixture is enriched, thereby correcting said frequency ratio of reverse.

6. An engine exhaust purification system as defined in claim 2, wherein said judging means detects a deterioration of each said oxygen sensor based on a voltage drop of an output of each said oxygen sensor.

7. An engine exhaust purification system as defined in claim 2, wherein said judging means detects a deterioration of each said oxygen sensor based on a delay in response of each said oxygen sensor.

* * * * *